(12) United States Patent
Nose et al.

(10) Patent No.: US 12,365,243 B2
(45) Date of Patent: Jul. 22, 2025

(54) VEHICLE DISPLAY CONTROL DEVICE, VEHICLE DISPLAY CONTROL METHOD, AND VEHICLE STORAGE MEDIUM

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 18/509,941

(22) Filed: Nov. 15, 2023

(65) Prior Publication Data
US 2024/0181879 A1   Jun. 6, 2024

(30) Foreign Application Priority Data
Dec. 6, 2022   (JP) .................. 2022-195129

(51) Int. Cl.
| | |
|---|---|
| *B60K 35/00* | (2024.01) |
| *B60W 30/12* | (2020.01) |
| *B60W 50/14* | (2020.01) |
| *G02B 27/01* | (2006.01) |
| *B60K 35/23* | (2024.01) |
| *B60K 35/28* | (2024.01) |

(52) U.S. Cl.
CPC ............. *B60K 35/00* (2013.01); *B60W 30/12* (2013.01); *B60W 50/14* (2013.01); *G02B 27/01* (2013.01); *B60K 35/23* (2024.01); *B60K 35/28* (2024.01); *B60K 2360/162* (2024.01); *B60K 2360/178* (2024.01); *B60W 2420/403* (2013.01)

(58) Field of Classification Search
CPC ........ B60K 35/00; B60K 35/23; B60K 35/28; B60K 2360/162; B60K 2360/178; B60W 30/12; B60W 50/14; B60W 2420/403; B60W 2050/146; G02B 27/01
See application file for complete search history.

(56) References Cited

U.S. PATENT DOCUMENTS

| | | | |
|---|---|---|---|
| 11,698,265 B2 * | 7/2023 | Kumon ............... | G01C 21/3658 345/7 |
| 2011/0301813 A1* | 12/2011 | Sun ....................... | B62D 15/029 348/148 |
| 2016/0284218 A1* | 9/2016 | Ejiri ..................... | G08G 1/166 |
| 2017/0039438 A1* | 2/2017 | Homma ................ | G06V 20/58 |
| 2017/0154554 A1* | 6/2017 | Tanaka ................. | G08G 1/166 |
| 2018/0015918 A1* | 1/2018 | Bae ..................... | B60W 30/0953 |
| 2018/0148072 A1* | 5/2018 | Kamiya ................ | B60W 50/14 |
| 2018/0178839 A1* | 6/2018 | Ide ....................... | B62D 15/029 |

(Continued)

FOREIGN PATENT DOCUMENTS

JP   2022-175877 A   11/2022

*Primary Examiner* — Ibrahim A Khan
(74) *Attorney, Agent, or Firm* — Oblon, McClelland, Maier & Neustadt, L.L.P.

(57) ABSTRACT

A vehicle display control device includes at least one processor, the processor being configured to recognize a travel lane, and to effect display of one image of preset plural images along a travel lane so as to be superimposed on a view ahead of a host vehicle in a case in which a travel position of the host vehicle has approached an edge of the travel lane.

6 Claims, 7 Drawing Sheets

(56) References Cited

U.S. PATENT DOCUMENTS

| | | | |
|---|---|---|---|
| 2019/0163993 A1* | 5/2019 | Koo | G06V 20/588 |
| 2021/0192787 A1* | 6/2021 | Jung | G06V 20/20 |
| 2022/0055481 A1* | 2/2022 | Shimizu | B60K 35/233 |
| 2022/0107497 A1* | 4/2022 | Murata | B60K 35/00 |
| 2022/0363251 A1 | 11/2022 | Shin et al. | |

\* cited by examiner

VEHICLE DISPLAY CONTROL DEVICE, VEHICLE DISPLAY CONTROL METHOD, AND VEHICLE STORAGE MEDIUM

CROSS-REFERENCE TO RELATED APPLICATION

This application is based on and claims priority under 35 USC 119 from Japanese Patent Application No. 2022-195129 filed on Dec. 6, 2022, the disclosure of which is incorporated by reference herein.

BACKGROUND

Technical Field

The present disclosure relates to a vehicle display control device, a vehicle display control method, and a vehicle storage medium.

Related Art

Japanese Patent Application Laid-open (JP-A) No. 2022-175877 discloses a vehicle display device that displays predetermined images at a display area indicating a foreground of a vehicle.

In JP-A No. 2022-175877, it is proposed, in a case in which it is determined that there is a possibility of a vehicle departing from a travel lane, that an image of a three-dimensional object is displayed along the travel lane to inform an occupant of a risk of lane departure.

However, when an image is displayed along a travel lane, displaying an image that deviates from the state of the scene ahead of the vehicle may cause the user to feel uneasy. Accordingly, there is room for improvement regarding this point in the related art described above.

SUMMARY

In consideration of the foregoing circumstances, an object of the present invention is to obtain a vehicle display control device, a vehicle display control method, and a vehicle storage medium that can reduce a user's uneasiness in a case in which an image is displayed along a travel lane in order to convey a risk of lane departure.

A vehicle display control device according to a first aspect of the present disclosure includes a lane recognition unit that recognizes a travel lane; and a display control unit that, in a case in which a travel position of a host vehicle has approached an edge of a travel lane, effects display of one image of preset plural images the travel lane so as to be superimposed on a view ahead of the host vehicle.

According to the vehicle display control device of the first aspect of the present disclosure, an image corresponding to a view ahead of the host vehicle can be displayed from among plural images. This enables a sense of uneasiness in a user to be reduced in a case in which an image is displayed along a travel lane in order to convey a risk of lane departure.

A vehicle display control device according to a second aspect of the present disclosure is the configuration of the first aspect, in which the display control unit effects display of an image set by a user in advance from among the plural images.

According to the vehicle display control device of the second aspect of the present disclosure, since an image set by the user is displayed, the user's sense of uneasiness can be reduced.

A vehicle display control device according to a third aspect of the present disclosure is the configuration of the first aspect, including an acquisition unit that acquires road information for a travel lane, in which display control unit effects display of an image selected based on the acquired road information from among the plural images.

According to the vehicle display control device of the third aspect of the present disclosure, since an image corresponding to the road information is displayed, a user's sense of uneasiness can be reduced.

A vehicle display control device according to a fourth aspect of the present disclosure is the configuration of the first aspect, including an acquisition unit that acquires at least one of a time during travel and weather information, in which the display control unit effects display of an image selected based on at least one of the acquired time during travel or weather information from among the plural images.

According to the vehicle display control device of the fourth aspect of the present disclosure, since an image based on the time during travel and weather information is displayed, the user's feeling of uneasiness can be reduced.

A vehicle display control device according to a fifth aspect of the present disclosure is the configuration of the first aspect, including an image setting unit configured to set a display size of the image, in which the display control unit effects display of the one image of the preset plurality of images at a set image size.

According to the vehicle display control device of the fifth aspect of the present disclosure, since the size of the image can be set to a display size that does not cause the user to feel uneasy when the image is displayed in a superimposed manner on the view ahead of the host vehicle, a user's feeling of uneasiness can be reduced.

A vehicle display control method according to a sixth aspect of the present disclosure recognizes a travel lane, and, in a case in which a travel position of a host vehicle has approached an edge of a travel lane, effects display of one image of preset plural images along the travel lane so as to be superimposed on a view ahead of the host vehicle.

A vehicle storage medium according to a seventh aspect of the present disclosure causes a computer to execute processing including recognizing a travel lane, and in a case in which a travel position of a host vehicle has approached an edge of a travel lane, effecting display of one image of preset plural images along the travel lane so as to be superimposed on a view ahead of the host vehicle.

As described above, in the vehicle display control device, the vehicle display control method, and the vehicle storage medium according to the present disclosure can reduce a user's uneasiness in a case in which an image is displayed along a travel lane in order to convey a risk of lane departure.

BRIEF DESCRIPTION OF THE DRAWINGS

Exemplary embodiments of the present invention will be described in detail based on the following figures, wherein.

DETAILED DESCRIPTION

Explanation follows regarding a vehicle 12 to which a vehicle display device 10 according to the exemplary embodiment is applied, with reference to FIG. 1 to FIG. 7.

Figure 1:
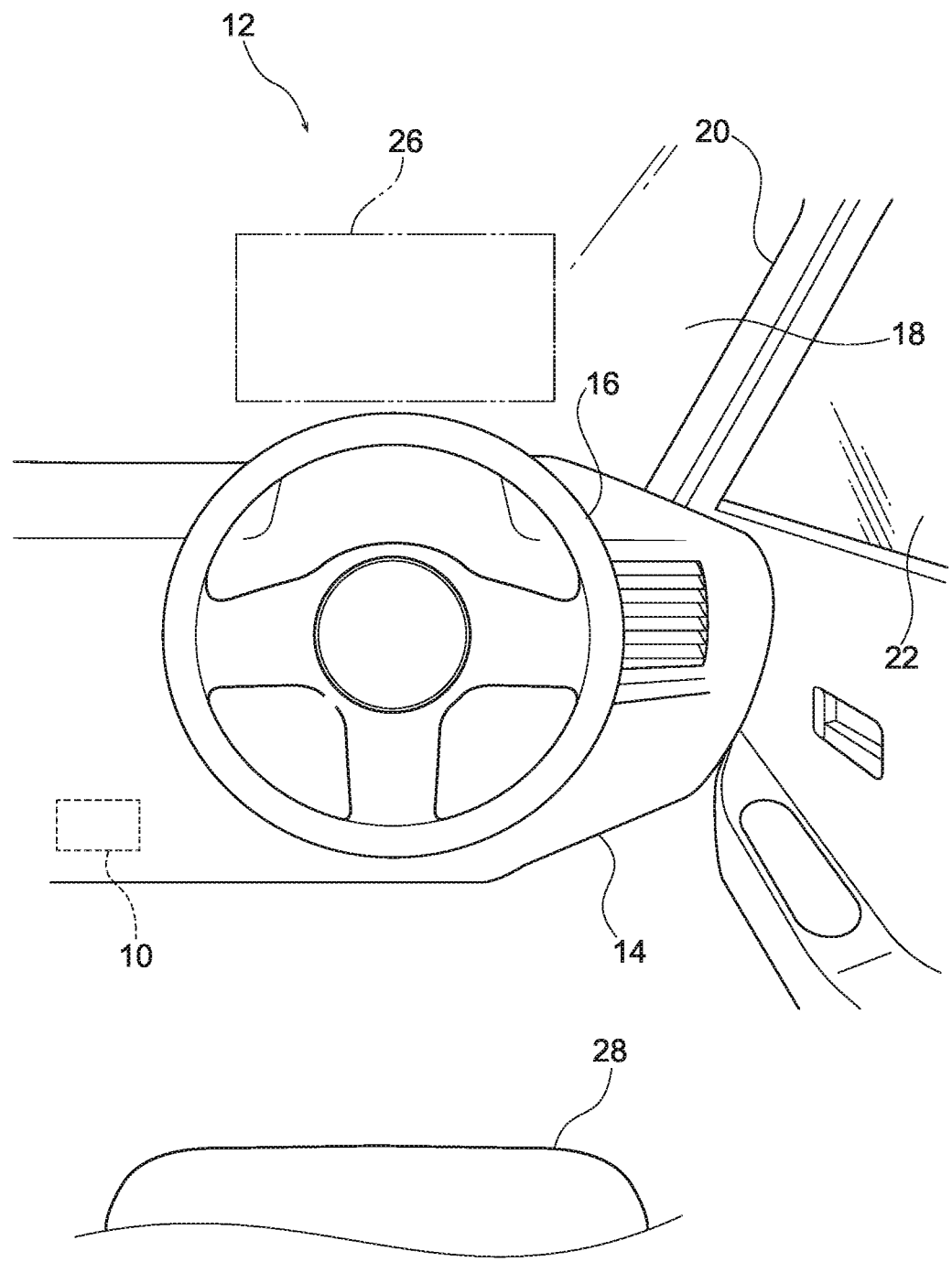
FIG. 1 is a schematic diagram illustrating a front section of a vehicle cabin, as viewed from a rearward side of the vehicle, of a vehicle to which a vehicle display device according to the present exemplary embodiment is applied.

As illustrated in FIG. 1, an instrument panel 14 is provided at a front portion of a vehicle 12 inside the vehicle cabin. The instrument panel 14 extends in the vehicle width direction, and a steering wheel 16 is provided at a vehicle right side of the instrument panel 14. Namely, in the present exemplary embodiment, as an example, the vehicle is a right hand drive vehicle that is provided with the steering wheel 16 on the right side, and a driving seat 28 is set on the vehicle right side.

A windshield glass 18 is provided at a front end portion of the instrument panel 14. The windshield glass 18 extends in the vehicle vertical direction and in the vehicle width direction to partition the inside of the vehicle cabin from the outside of the vehicle cabin.

At a front side of the driving seat 28, the windshield glass 18 is provided with a head-up-display display region 26 (hereafter, simply referred to as the "display region 26"). The display region 26 is configured by a projection plane projected by a head-up display device 48 (see FIG. 2) serving as a vehicle display device. More specifically, the head-up display device 48 is provided at a vehicle front side of the instrument panel 14, and the head-up display device 48 is configured so as to project an image onto the display region 26 of the windshield glass 18. Namely, the display region 26 is a part of the windshield glass 18, which serves as a projection surface of the head-up display device 48.

Note that the vehicle 12 is provided with the vehicle display control device 10. A vehicle display control device 10 of the present exemplary embodiment is configured by, for example, one or more electronic control units (ECUs).

(Hardware Configuration of Vehicle Display Control Device 10)

Figure 2:
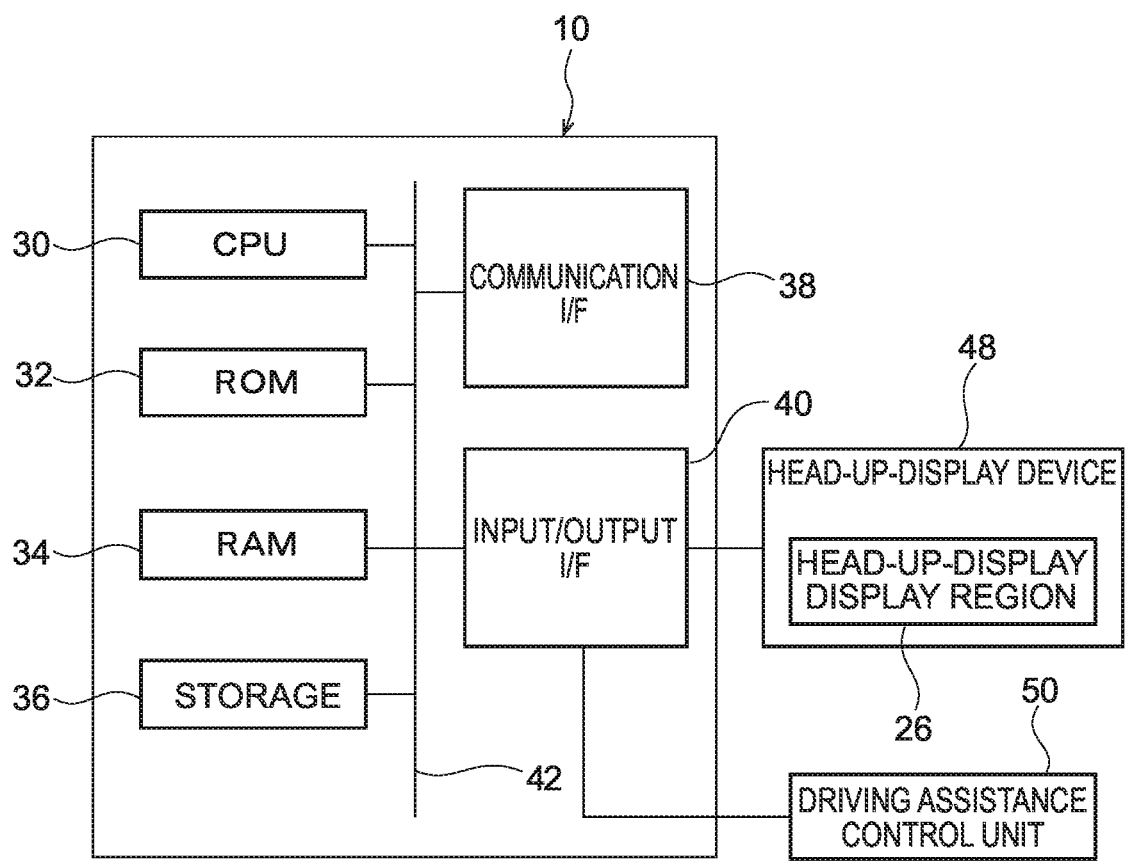
FIG. 2 is a block diagram illustrating a hardware configuration of a vehicle display device according to the present exemplary embodiment.

FIG. 2 is a block diagram illustrating a hardware configuration of the vehicle display control device 10. As illustrated in FIG. 2, the vehicle display control device 10 is configured including a central processing unit (CPU; serving as a processor) 30, read only memory (ROM) 32, random access memory (RAM) 34, storage 36, a communication interface (I/F) 38, and an input/output interface (I/F) 40. These configurations are connected together through a bus 42 so as to be capable of communicating with each other.

The CPU 30 is a central processing unit that executes various programs and controls various units. Namely, the CPU 30 reads a program from the ROM 32 or the storage 36, and executes the program using the RAM 34 as a workspace. The CPU 30 controls the respective configurations and performs various computation processing according to a program recorded in the ROM 32 or the storage 36.

The ROM 32 holds various programs and various data. The RAM 34 serves as a workspace to temporarily store programs and data. The storage 36 is configured by a hard disk drive (HDD) or a solid state drive (SSD), and holds various programs including an operating system, as well as various data.

The communication I/F 38 is an interface used by the vehicle display control device 10 to communicate with an external server and other equipment, and for example, employs a protocol such as CAN (Controller Area Network), Ethernet (registered trademark), LTE (Long Term Evolution), FDDI (Fiber Distributed Data Interface), Wi-Fi (registered trademark), or the like.

The input/output I/F 40 is electrically connected to the head-up display device 48 and a driving system control unit 50.

The head-up display device 48 displays predetermined information on the display region 26 of the windshield glass 18.

The driving system control unit 50 is a control device that controls various driving systems installed in the vehicle 12, and for example, is configured by one or plural electronic control units (ECUs). The various driving systems include autonomous driving systems and travel assistance systems. The travel assistance systems include various Advanced Driving Assistant Systems (ADAS), such as a stop system or a start system for avoiding contact between a detected object and the vehicle 12, an adaptive cruise control (ACC) system, lane tracing assistance (LTA) system, and lane change assistance (LCA). The driving system control unit 50 controls various actuators installed in the vehicle 12 to automatically perform some or all of operation of an accelerator, brake, direction indicator, steering, and the like of the vehicle 12, thereby actuating various driving systems.

(Functional Configuration of Vehicle Display Control Device 10)

The vehicle display control device 10 implements various functionality using the above hardware resources. Explanation follows regarding functional configuration implemented by the vehicle display control device 10, with reference to FIG. 3.

Figure 3:
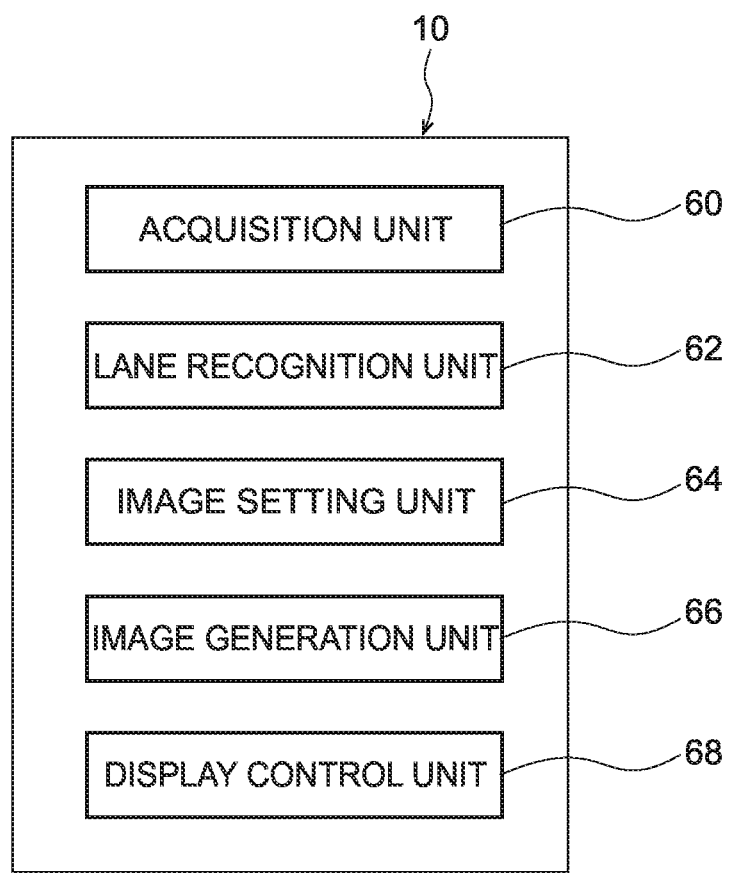
FIG. 3 is a schematic diagram illustrating a functional configuration of a vehicle display device according to the present exemplary embodiment.

As illustrated in FIG. 3, the functional configuration of the vehicle display control device 10 includes an acquisition unit 60, a lane recognition unit 62, an image setting unit 64, an image generation unit 66, and a display control unit 68. The respective functional configuration is implemented by the CPU 30 reading and executing a program stored in the ROM 32 or the storage 36.

The acquisition unit 60 acquires information relating to control of the driving system based on a signal transmitted from the driving system control unit 50. In the present exemplary embodiment, in particular, the vehicle 12 acquires information relating to control of the LCA system. The LCA system supports steering operation required to maintain a lane in a case in which a risk of the vehicle 12 departing from a travel lane has been detected. As an example, the vehicle display control device 10 performs display processing, described below, in conjunction with operation of the LCA system. Namely, in cases in which a risk of the vehicle 12 departing from the travel lane has been detected, a predetermined image is displayed on the display region 26 of the windshield glass 18 in order to inform the user of the risk of lane departure.

Moreover, the acquisition unit 60 acquires road information for a travel lane of the vehicle 12. This road information includes information relating to the circumstances of the road surface of the travel lane, such as the color of the road surface and the type of partition line. These items of road information can be acquired by various methods. For example, road information may be acquired based on an image obtained by capturing the surroundings (forward, rearward, or sides) of the vehicle 12 with an onboard camera, not illustrated. Alternatively, for example, satellite photographs, weather information, external map data, and the like may be acquired from an external server via the communication I/F 38, and road information may be acquired based on the acquired data. Moreover, for example, in a case in which high-precision map data is stored in the storage 36, the road information may be acquired based on the high-precision map data.

Moreover, the acquisition unit 60 acquires time during travel and weather information for the current position of the vehicle 12. These items of information specify the current position of the vehicle 12 based on, for example, a signal from a non-illustrated GPS (Global Positioning System) sensor, and the time and weather information corresponding to the current position may be acquired from an external server.

The lane recognition unit 62 recognizes a travel lane of the vehicle 12. Various known methods can be employed to recognize a travel lane. In an example of the present exemplary embodiment, an onboard camera, not illustrated, captures images of the surroundings (forward, rearward, and sides) of the vehicle 12, and based on the captured images, the travel lane is recognized from boundaries such as a partition line, asphalt, grass, soil, or a curb.

The image setting unit 64 performs various settings regarding an image to be displayed in the display region 26. For example, the image setting unit 64 selects one of plural preset images according to a display mode set by a user, and sets the selected image as an image to be displayed in the display region 26.

Figure 4:
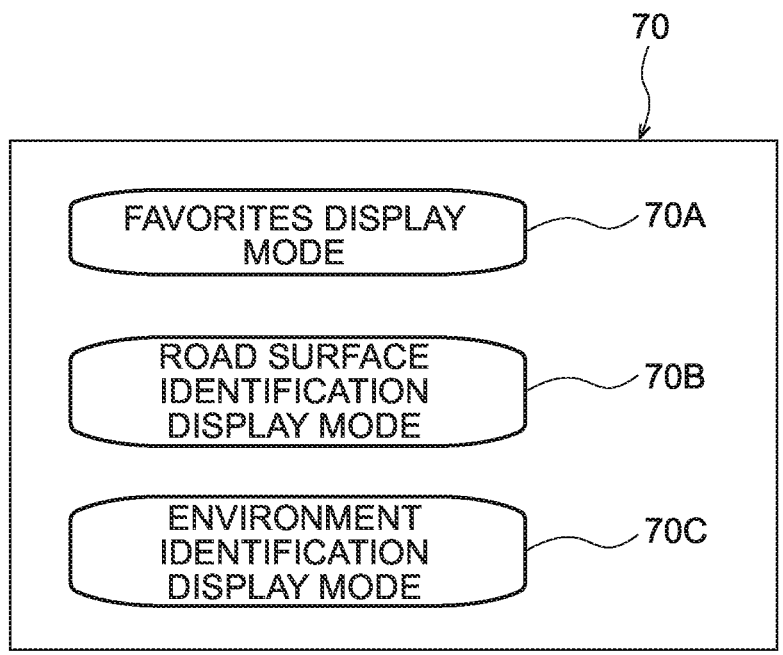
FIG. 4 is a diagram illustrating an exemplary configuration window presented to a user.

FIG. 4 illustrates an example of a setting screen 70 presented to a user when selecting a display mode. The setting screen 70 is displayed on a display unit (not shown) configured by a display or the like. Mode selection objects (70A to 70C) corresponding to plural display modes are displayed on the setting screen. The user operates an operation unit (not shown) to select one mode selection object, thereby executing a corresponding display mode.

A favorites display mode serves as a display mode that displays one image set by the user from among plural preset images.

A road surface identification display mode serves as a display mode in which an image selected from among plural preset images based on the road information acquired by the acquisition unit 60 is displayed. In this road surface identification display mode, for example, the state of the road surface, such as the color of the road surface or the type of the partition line, is determined, and an image that is expected to not deviate from the state of the road surface is selected.

Note that a case that does not deviate from the state of the road surface is a broad concept that encompasses both of not being unrealistic to the extent that a user will feel uneasy, and the road surface and the displayed image not being so difficult to distinguish from each other as to make the user feel uneasy.

For example, in a case in which no partition line is drawn on the road surface, an image simulating a partition line may be selected. Alternatively, for example, in a case in which a partition line is drawn on a road surface, an image with a different color from the partition line may be selected. Alternatively, for example, an image with a color that enables the road surface and the display image to be easily distinguished from each other may be selected in accordance with the color of the road surface. The image setting unit 64 may select an image based on a table in which, for example, the circumstances of a road surface and an image are associated with each other.

An environment identification display mode serves as a display mode in which an image selected from plural preset images based on at least one of the time during travel or weather information is displayed. For example, an image that is expected to easily harmonize with the peripheral environment of the vehicle 12 is selected in consideration of the time during travel and weather information for the current position of the vehicle 12.

Note that a case that will easily harmonize with the peripheral environment of the vehicle 12 is a broad concept encompassing both of not being unrealistic to the extent that a user will feel uneasy, and the road surface and the displayed image not being so difficult to distinguish from each other as to make the user feel uneasy.

For example, the brightness of the vehicle surroundings may be determined according to whether the vehicle is driving during the day or during the night, and an image with a color that makes it easy to distinguish between the road surface and the display image may be selected. Alternatively, for example, an image with a design that matches the weather may be selected in accordance with the weather information.

Moreover, the image setting unit 64 sets a display size of an image. The image setting unit 64 can set a display size set in advance by a user by, for example, operating an operation unit (not shown). The image setting unit 64 may set the image size according to at least one of road information, the time during travel, or weather information.

The image generation unit 66 generates an image to be displayed in the display region 26 based on the information set by the image setting unit 64.

The display control unit 68 displays the image generated by the image generation unit 66 on the display region 26 based on the driving system control information transmitted from the driving system control unit 50. For example, an image is displayed by the acquisition unit 60 acquiring information indicating that the LCA system has been activated.

The display control unit 68 effects control so as to display the image generated by the image setting unit 64 along the travel lane so as to be superimposed on the view ahead of the vehicle 12. Namely, the image generated by the image setting unit 64 is an AR image. The AR image is an image depicted using augmented reality technology. Namely, the view ahead of the vehicle 12 is visible in the display region 26 through the windshield glass 18, and an image is displayed superimposed on this view. The display control unit 68 transmits output data for the generated image to the head-up display device 48, and the transmitted output data is output by the head-up display device 48.

Figure 5:
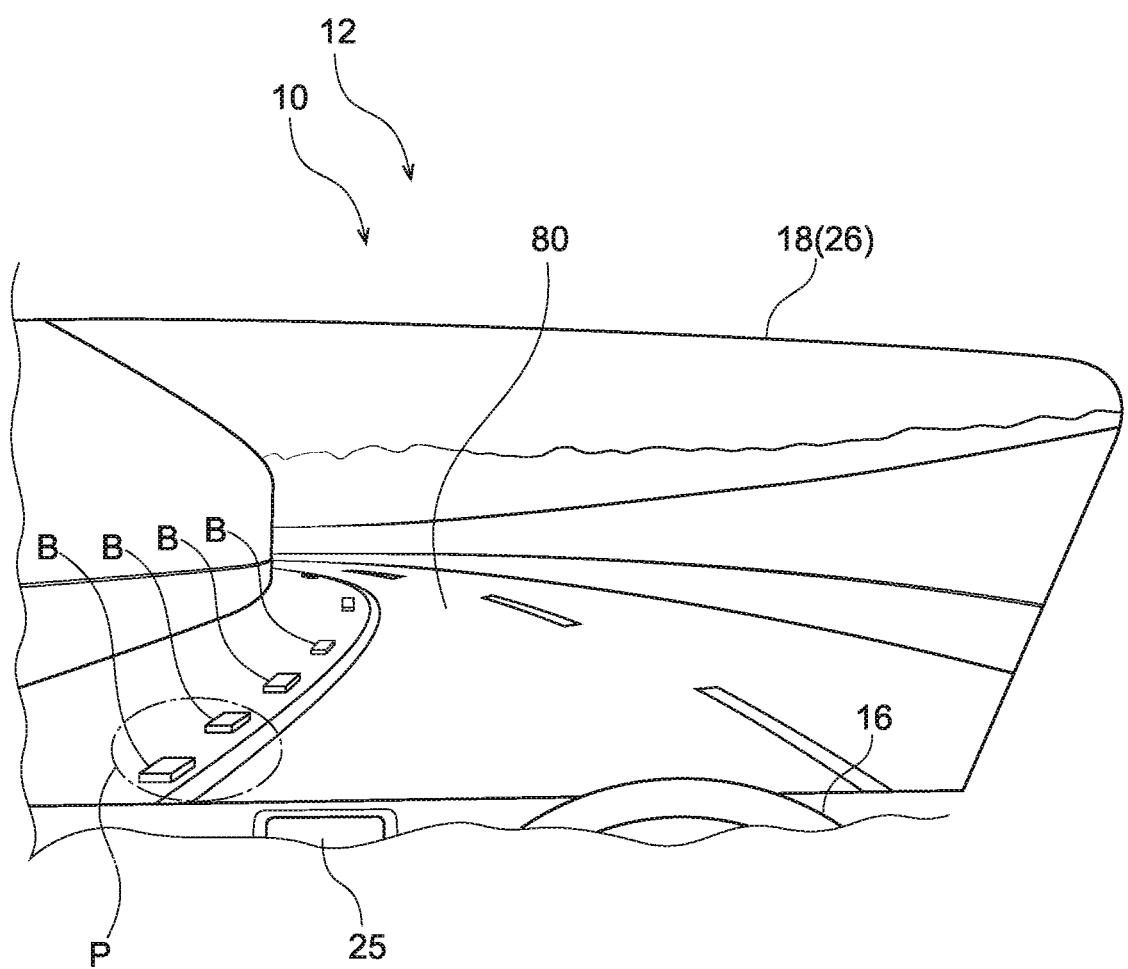
FIG. 5 is a diagram illustrating exemplary images displayed along a travel lane.
Figure 6:
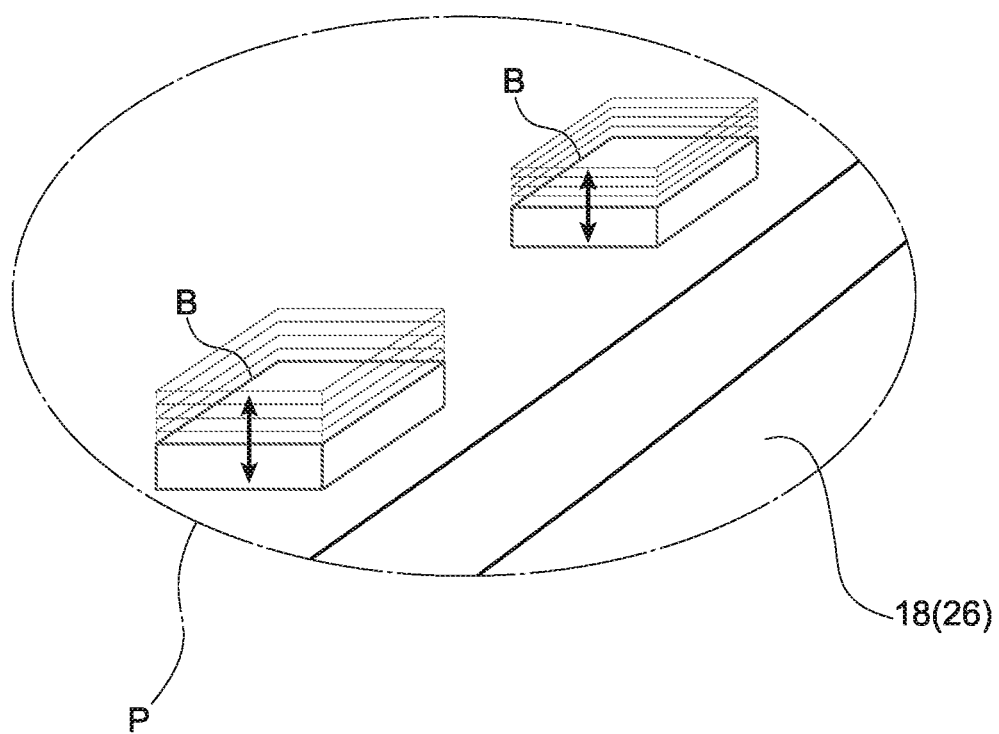
FIG. 6 is a partial enlarged view illustrating an exemplary method of displaying the images illustrated in FIG. 5.

Explanation follows regarding an example of an image displayed along a travel lane, with reference to FIG. 5 and FIG. 6. As illustrated in these drawings, in a case in which the travel position of the vehicle 12 has approached the edge of the travel lane (the left edge in FIG. 5), in the illustrated example in which the plural images B are displayed along the travel lane 80 through the display region 26, the images B are block-shaped stereoscopic images. The respective images B are depicted by animation that moves from the far side to the near side of the display region 26. This enables the visual effect of the vehicle 12 during travel running over an approaching three-dimensional object to be imparted to a user who has viewed the display region. Moreover, in the animation of the image B, after the movement is stopped at the near side of the display region, the images are displayed in a row along the travel lane 80. This enables a visual effect to be imparted to an occupant in the driving seat such that rumble strips are formed along the white line on the departure direction (leftward) side of the vehicle 12.

FIG. 6 is an enlarged view of the region P illustrated in FIG. 5. As illustrated in this drawing, the stereoscopic image B, whose movement has been stopped at the near side of the display region, is displayed so as to vibrate in the vertical direction. This enables the occupant of the driving seat who has viewed the display region 26 to be provided with a realistic sensation that the vehicle 12 is running over a three-dimensional object and vibrating.

(Operation of Display Processing)

Figure 7:
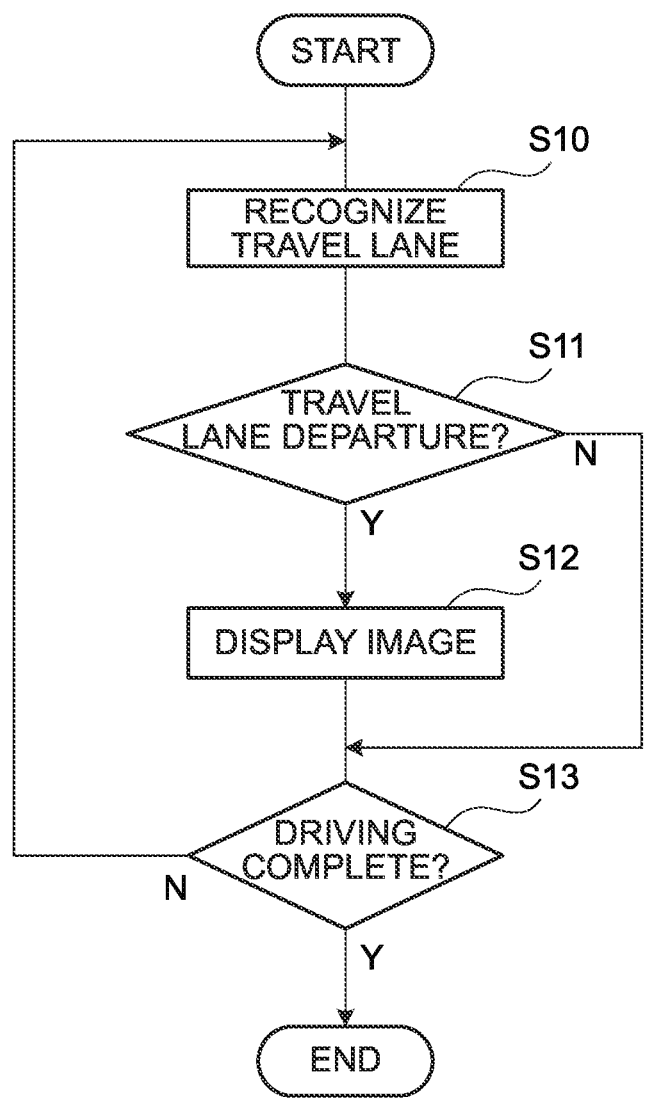
FIG. 7 is a flow chart illustrating an exemplary flow of display processing in the present exemplary embodiment.

Explanation follows regarding an example of operation of display processing executed by the vehicle display control device 10, with reference to the flowchart illustrated in FIG. 7. This display processing is executed, for example, when the ignition switch of the vehicle 12 is turned ON. The display processing is executed by the CPU 30 reading a program from the ROM 32 or the storage 36 and opening the program in the RAM 34.

As illustrated in FIG. 7, at step S10, the CPU 30 recognizes the travel lane of the vehicle 12 using the functionality of the lane recognition unit 62.

At step S11, the CPU 30 determines whether or not there is a risk of lane departure by the vehicle 12. More specifically, the CPU 30 determines whether or not travel assistance using the LCA system has been activated by the travel position of the vehicle 12 approaching the edge of the travel lane. In a case in which the LCA system of the vehicle 12 is operating, the determination of step S11 is affirmative, and the CPU 30 proceeds to the processing of step S12. In a case in which the LCA system of the vehicle 12 is not operating, however, the determination at step S11 is negative, and the CPU 30 proceeds to the processing at step S13.

At step S12, the CPU 30 displays an image on the display region 26 using the functionality of the image generation unit 66 and the display control unit 68. As illustrated in FIG. 5, the user perceives the image B displayed along the travel lane 80 seen through the display region 26. This enables the user to recognize the risk of vehicle departure.

At step S13, the CPU 30 determines whether or not driving of the vehicle has ended. More specifically, for example, it is determined whether or not the ignition switch of the vehicle 12 has been switched OFF. In a case in which the ignition switch has been turned OFF, the determination at step S13 is affirmative, and the CPU 30 ends the display processing. On the other hand, in a case in which the ignition switch has not been switched OFF, the determination at step S13 is negative, and the CPU 30 returns to the processing at step S10.

(Mechanism and Effects)

As described above, in the vehicle display control device 10 according to the present exemplary embodiment, as illustrated in FIG. 5, an image B corresponding to the view ahead of the vehicle 12 (host vehicle) can be displayed from among plural images. This enables a sense of uneasiness in a user to be reduced in a case in which an image is displayed along a travel lane in order to convey a risk of lane departure.

Moreover, in the present exemplary embodiment, since the image set by the user is displayed by setting the favorites display mode, the user's sense of uneasiness is reduced.

Moreover, in the present exemplary embodiment, the setting of the road surface identification display mode causes an image corresponding to the road information to be displayed, thereby reducing the sense of uneasiness of the user.

Moreover, in the present exemplary embodiment, the setting of the environment identification display mode causes an image based on the time during travel or weather information to be displayed, thereby reducing the user's sense of uneasiness.

Moreover, in the present exemplary embodiment, a sense of uneasiness in the user is reduced because the size of the image can be set to a display size that does not cause the user to feel uncomfortable when the image is displayed in a superimposed manner on the view ahead of the vehicle 12.

Although explanation has been given regarding the vehicle display control device 10 according to the exemplary embodiment, various embodiments may, of course, be implemented within a range not departing from the gist of the present invention. For example, in the exemplary embodiment described above, the configuration is such that the user selects the display mode and an image is selected according to the selected display mode; however, it may be displayed in a single display mode installed in advance in the vehicle. Alternatively, display may be performed using a combination of plural display modes.

Although an example in which an image is displayed on the display region 26 of the head-up display device 48 has been described in the above exemplary embodiment, there is no limitation thereto. For example, the present invention may be applied to cases in which an image is displayed on a display or the like provided on an instrument panel. In this case, an image is displayed along the travel lane so as to be superimposed on an image captured of the foreground of the vehicle 12. Further, the display region may be a display of an external device or the like. For example, the display may be a display of an operation device operated by an operator who performs remote driving. Accordingly, the user in the above exemplary embodiments may be an occupant inside the vehicle cabin or an operator at a remote location.

Moreover, the processing executed by the CPU 30 reading and executing the program in the above exemplary embodiments may be executed by various types of processor other than the CPU 30. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The display processing may be executed by any one of these various types of processor, or by a combination of two or more of the same type or different types of processor, and may be executed by plural FPGAs, or by a combination of a CPU and an FPGA, for example. The hardware structure of these various types of processors is more specifically an electric circuit combining circuit elements such as semiconductor elements.

Although the various data is stored in the storage 36 in the exemplary embodiment described above, there is no limitation thereto. For example, a non-transitory recording medium such as a compact disc (CD), a digital versatile disc (DVD), or universal serial bus (USB) memory may act as a storage unit. In this case, various programs, data, and the like are stored in these recording media.

What is claimed is:

1. A vehicle display control unit, comprising:
   at least one processor, the at least one processor being configured to:
   recognize a travel lane;

acquire road information for the travel lane; and in a case in which a travel position of a host vehicle has approached an edge of a travel lane, effect display, in a manner superimposed on a view ahead of the host vehicle, of a stereoscopic image selected from among a preset plurality of stereoscopic images, wherein the stereoscopic image is selected based on at least one of a road surface color or a type of partition line included in the acquired road information, and displayed along the travel lane at a position that does not overlap with the travel lane or the partition line.

2. The vehicle display control unit of claim 1, wherein the at least one processor effects display of an image set by a user in advance from among the plurality of images.

3. The vehicle display control unit of claim 1, wherein the at least one processor:

acquires at least one of a time during travel or weather information, and effects display of an image selected based on at least one of the acquired time during travel or weather information from among the plurality of images.

4. The vehicle display control unit of claim 1, wherein the at least one processor:

sets a display size of the image, and effects display of the one image of the preset plurality of images at a set image size.

5. A vehicle display control method, comprising:

recognizing a travel lane;

acquiring road information for the travel lane; and in a case in which a travel position of a host vehicle has approached an edge of a travel lane, effecting display, in a manner superimposed on a view ahead of the host vehicle, of a stereoscopic image selected from among a preset plurality of stereoscopic images, wherein the stereoscopic image is selected based on at least one of a road surface color or a type of partition line included in the acquired road information, and displayed along the travel lane at a position that does not overlap with the travel lane or the partition line.

6. A non-transitory computer-readable storage medium storing a program executable by a processor to perform processing comprising:

recognizing a travel lane;

acquiring road information for the travel lane; and in a case in which a travel position of a host vehicle has approached an edge of a travel lane, effecting display, in a manner superimposed on a view ahead of the host vehicle, of a stereoscopic image selected from among a preset plurality of stereoscopic images, wherein the stereoscopic image is selected based on at least one of a road surface color or a type of partition line included in the acquired road information, and displayed along the travel lane at a position that does not overlap with the travel lane or the partition line.

* * * * *